(12) United States Patent
Rushkin et al.

(10) Patent No.: US 11,568,753 B2
(45) Date of Patent: Jan. 31, 2023

(54) SYSTEMS AND METHODS FOR LEARNER GROWTH TRACKING AND ASSESSMENTS

(71) Applicant: BrainPOP IP LLC, New York, NY (US)

(72) Inventors: Ilia Rushkin, Cambridge, MA (US); Yigal Rosen, Brookline, MA (US)

(73) Assignee: BRAINPOP IP LLC, New York, NY (US)

( * ) Notice: Subject to any disclaimer, the term of this patent is extended or adjusted under 35 U.S.C. 154(b) by 0 days.

(21) Appl. No.: 17/716,944

(22) Filed: Apr. 8, 2022

(65) Prior Publication Data

US 2022/0327946 A1 Oct. 13, 2022

Related U.S. Application Data

(60) Provisional application No. 63/172,433, filed on Apr. 8, 2021.

(51) Int. Cl.
*G09B 5/02* (2006.01)
*G09B 5/06* (2006.01)
*G09B 7/00* (2006.01)

(52) U.S. Cl.
CPC .............. *G09B 5/02* (2013.01); *G09B 5/065* (2013.01); *G09B 7/00* (2013.01)

(58) Field of Classification Search
CPC .............. G09B 5/02; G09B 5/065; G09B 7/00
See application file for complete search history.

(56) References Cited

U.S. PATENT DOCUMENTS

| | | | |
|---|---|---|---|
| 2014/0205990 A1* | 7/2014 | Wellman | G09B 7/00 434/362 |
| 2014/0308645 A1* | 10/2014 | Chaniotakis | G09B 7/06 434/350 |
| 2015/0026184 A1* | 1/2015 | Ossikine | G09B 5/00 434/322 |
| 2017/0154539 A1* | 6/2017 | King | G09B 5/12 |
| 2018/0293905 A1* | 10/2018 | Benz | G09B 19/00 |
| 2020/0327821 A1* | 10/2020 | Holzheimer | G09B 5/00 |
| 2021/0294568 A1* | 9/2021 | Summers, II | G09B 21/006 |

* cited by examiner

*Primary Examiner* — Eddy Saint-Vil
(74) *Attorney, Agent, or Firm* — Gardella Grace P.A.

(57) ABSTRACT

Systems and methods for conducting automated skills mastery assessments in an e-learning environment may include assessing learner engagements with learning resources to produce mastery assessments, using historic interaction data derived through the engagements to train machine learning algorithm(s) to forecast evaluation outcomes of engagements based on engagement patterns indicative of skill fading, imparting learning, initial level of mastery, and/or a difficulty of acquiring mastery, applying the learning algorithm(s) to historic user interactions with learning resources to produce predicted evaluation outcomes, and, based on any differences between predicted outcomes and actual outcomes, refining parameter(s) of a mastery assessment parameter set used in calculating the mastery assessments, where a portion of the parameters correspond to attribute(s) of connections between the learning resources and skills of a skill hierarchy. The connections may be represented by logical indicators of relationships defined between the learning resources and the skills.

28 Claims, 9 Drawing Sheets

SYSTEMS AND METHODS FOR LEARNER GROWTH TRACKING AND ASSESSMENTS

CROSS REFERENCE TO RELATED APPLICATIONS

This application claims priority to U.S. provisional patent application No. 63/172,433, filed on Apr. 8, 2021, the entire contents of which are incorporated herein by reference in their entirety.

BACKGROUND

Digital learning systems present learning materials, such as text, video, audio, and/or interactive content, focused on teaching a learner about topics of interest. Some digital learning systems can dynamically change the presentation of content to the user based on the user's individual record of interacting with the digital learning system, thereby customizing content to the user's prior history with the digital learning system. Often, learning content is presented to users by a digital learning system, and, based upon user interactions with the content, the digital learning system will score or grade the user's accuracy or responses within the interactions. In illustration, a digital learning system may score a number of correct responses to an online quiz. However, this focus on a particular piece of content limits the ability to trace mastery of skills. The inventors recognized the need for an e-learning platform, systems, and methods providing the advantages of a traceable path toward mastery of skills through interactions with digital learning content.

SUMMARY OF ILLUSTRATIVE EMBODIMENTS

In one aspect, the present disclosure describes systems and methods for enabling evaluation of a learner's mastery of skills based on the learner's interactions with learning resources of an electronic learning platform that are connected, via logical indicators of relationships (e.g., links, tags), with multiple skills per learning resource. In some embodiments, various systems and methods described herein enable evaluation of a learner's mastery of combinations of skills. For example, the systems and/or methods may enable consideration and/or exploitation of a hierarchical structure of skills such that mastery may be evaluated on the skills that are higher in the hierarchy than (e.g., ancestors of) the skills to which learning resources are connected.

The logical indicators of relationships between the learning resources and the skill hierarchy, in some embodiments, support a multi-dimensional learning model used to enhance development of multiple skills simultaneously, such as history and language learning or mathematics and science. Multi-dimensional learning models, for example, may improve skill mastery and learning retention through developing and strengthening skills across learning disciplines. Assessments of skill mastery, in multi-dimensional learning models, may involve applying factors to the logical indicators of relationships that portion the impact of certain learning resources among the skills developed or enhanced by that learning resource. For example, a strength factor may be applied to a portion of the logical indicators of relationships representing the impact of the linked skill relative to the whole of the e-learning resource. In illustration, an electronic learning resource having content directed to both a history skill and a grammar skill may include a first logical indicator of relationship (link or tag, as used herein) connecting the electronic learning resource to the history skill with a first strength factor and a second logical indicator of relationship connecting the electronic learning resource to the grammar skill with a second strength factor.

In some embodiments, mastery assessments are conducted to determine skill mastery in one or more skill areas. The mastery assessments may be calculated using a set of mastery assessment parameters, including at least one parameter related to one or more attributes of the logical indicators of relationships, such as the aforementioned strength attribute.

In assessing mastery of skills in the e-learning platform, in some embodiments, a regression type machine learning algorithm may be applied to data representative of historic learner engagements with the learning resources to derive patterns that, when applied to interactions performed by learners when engaging with the learning resources content, predict evaluation outcomes based on the interactions data. The predictions, in some examples, may be enhanced through machine-learning derived patterns related to skill fading, imparting learning, initial level of mastery, and/or difficulty of acquiring mastery.

Differences between actual outcomes and predicted outcomes, in some embodiments, are analyzed to determine adjusted mastery assessment parameters. The impact related to the various mastery assessment parameters (e.g., factors of the mastery assessment algorithm) can be refined, at this stage, to better align with the patterns derived from the historic data by the machine learning algorithm(s).

The foregoing general description of the illustrative implementations and the following detailed description thereof are merely exemplary aspects of the teachings of this disclosure and are not restrictive.

DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values or dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

Figure 1A:
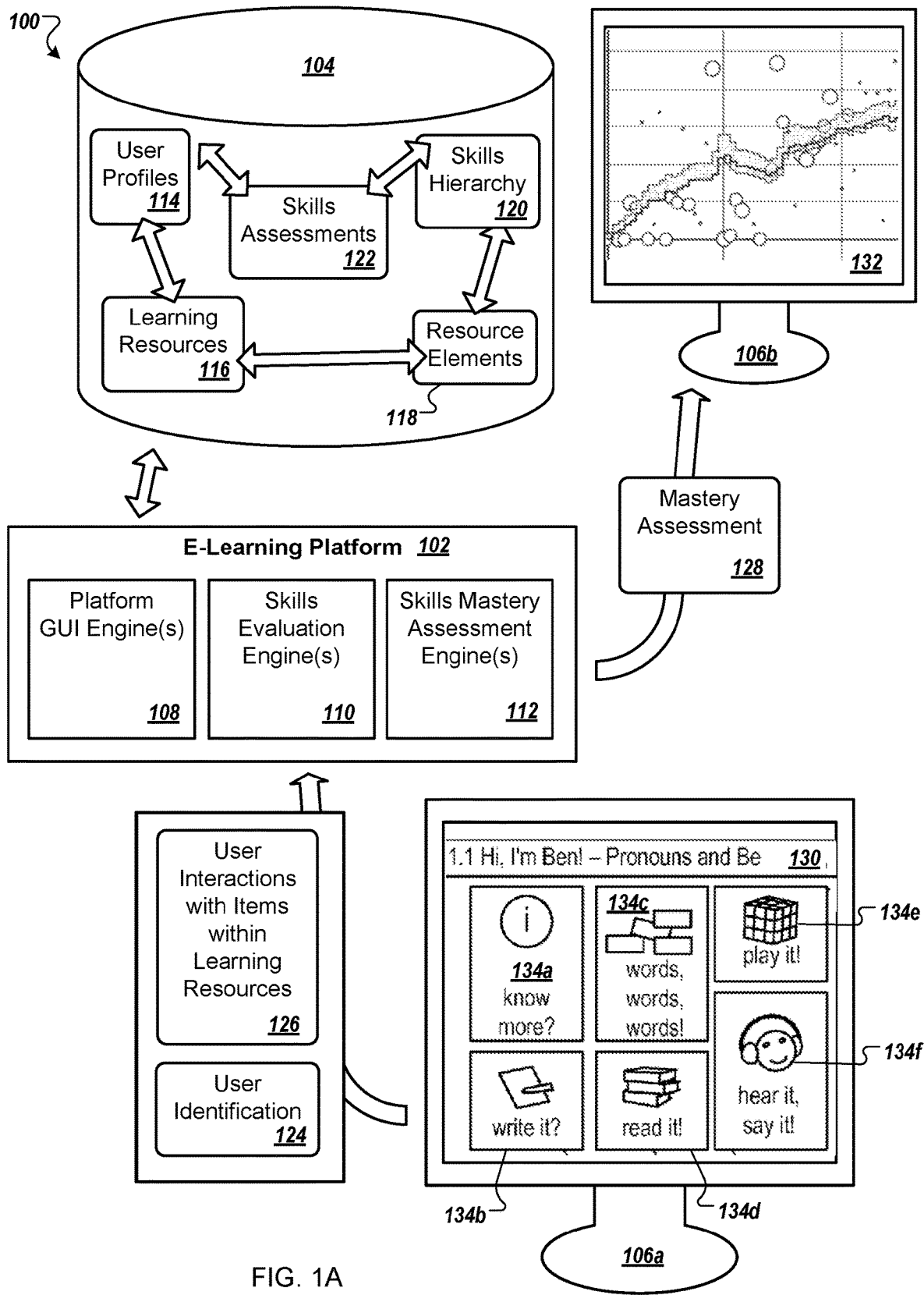
FIG. 1A is a flow diagram of an example process for assessing skills mastery in an electronic learning environment.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

FIG. 1A illustrates a block diagram of an example system 100 for assessing skill mastery in an electronic learning (e-learning) environment. The system 100 involves an e-learning platform 102 providing interactive learning resources 116 to one of a set of users identified by user profiles 114 through a platform graphical user interface engine 108. Through user interactions 126 of an identified user 124 with elements within the learning resources 116, one or more skills evaluation engines 110 and skills mastery assessment engines 112 can assess and/or update progress in learning skills based on links, within the learning resources 116, to one or more individual learning resource elements 118, each corresponding to at least one skill within a skills hierarchy 120. The assessments, for example, may be stored as skills assessments 122 linked to each individual user's profile 114.

The learning resources 116, in some implementations, are arranged in a web site or web portal e-learning environment, as illustrated in an example screen shot 130 at a user computing device 106a. Individual learning resources, in some examples, can include one or more quizzes, videos, readings, simulations, data manipulatives, online drawing activities, graphical coding modules, interactive learning modules, information or notes arranging modules, and/or games. As illustrated, the example screen shot 130 includes a set of learning resources 134 for selection, including a link to information 134a (e.g., one or more additional and/or external resources for learning about the subject "pronouns and be"), a writing activity 134b (e.g., "write it?"), a data manipulative 134c (e.g., "words, words, words!"), a reading 134d (e.g., "read it!"), a game 134e (e.g., "play it!"), and an interactive learning module 134 (e.g., "hear it, say it!"). The learning resources 134, for example, may be part of a foreign language instruction, English as a second language instruction, or early learning instruction.

As the user at the computing device 106a interacts with one of the learning resources 134, in some implementations, the e-learning platform 102 gathers interactions 126 with learning resource elements 118 within the selected learning resource 134 and associates the interactions 126 with a user identification 124 of the user logged into the e-learning platform 102 via the computing device 126. The learning resource elements 118, for example, can include individual questions, data entry fields, game levels or skills completions within an ongoing game type learning resource 116. In other words, interactions with learning resource elements 118 can include, in some examples, typed responses, utterances (e.g., in the verbal interactive learning module 134), gestures (e.g., captured by a video camera of the computing device 106a or an accelerometer of an input device connected to the computing device 106a), selections of controls within the user interface 130, movement of interactive elements within the user interface 130, or submission of activities (e.g., drawings, maps, code segments, etc.) through the learning resources 116. Further, interactions data can include timing of interactions, such as how long the learner took to answer a question after presentation of the question or a length of time the learner spent solving a problem, such as performing iterative moves in an interactive challenge. In an additional example, interactions data can include a portion presented to the learner, for example a portion of a reading document scrolled through by the learner while reading or a portion of an educational video played.

In some implementations, one or more skills evaluation engines 110 match each interaction to an individual element with at least one skill logically connected to the learning resource element in a skills hierarchy 120 via logical indicators of relationships. The skills evaluation engine(s) 110, for example, can include engines designed to evaluate skills based upon different styles of interactions, such as the example interactions described above. The skills evaluation engine(s) 110 may log the results of the assessment of the user interactions 126 as a skill assessment 122 of the user 124 as linked to one of the user profiles 114.

In building skills via the e-learning platform 102, in some implementations, one or more skills mastery assessment engine(s) 112 may analyze skills assessments 122 individually and/or over time to derive an ongoing mastery assessment 128 related to the user having user identification 124. The mastery assessment 128, for example, may be provided to a computing device 106b (e.g., the student computing device 106a, a teacher computing device, and/or a parent or other supervising user computing device) for presentation as a mastery assessment graphical user interface 132. The mastery assessment 128, in some examples, may include relevant times (e.g., a timespan, one or more timestamps, etc.) of interaction with the e-learning platform 102 to work on skills of a particular type or subject (e.g., sub-hierarchy), a last learning resource element of interaction, a current mastery value, an evaluation of mastery over time (e.g., bar graph, line graph, etc.) and/or mastery confidence interval information. An example mastery assessment 128 is presented, for example, in FIG. 5A, described in greater detail below.

Figure 1B:
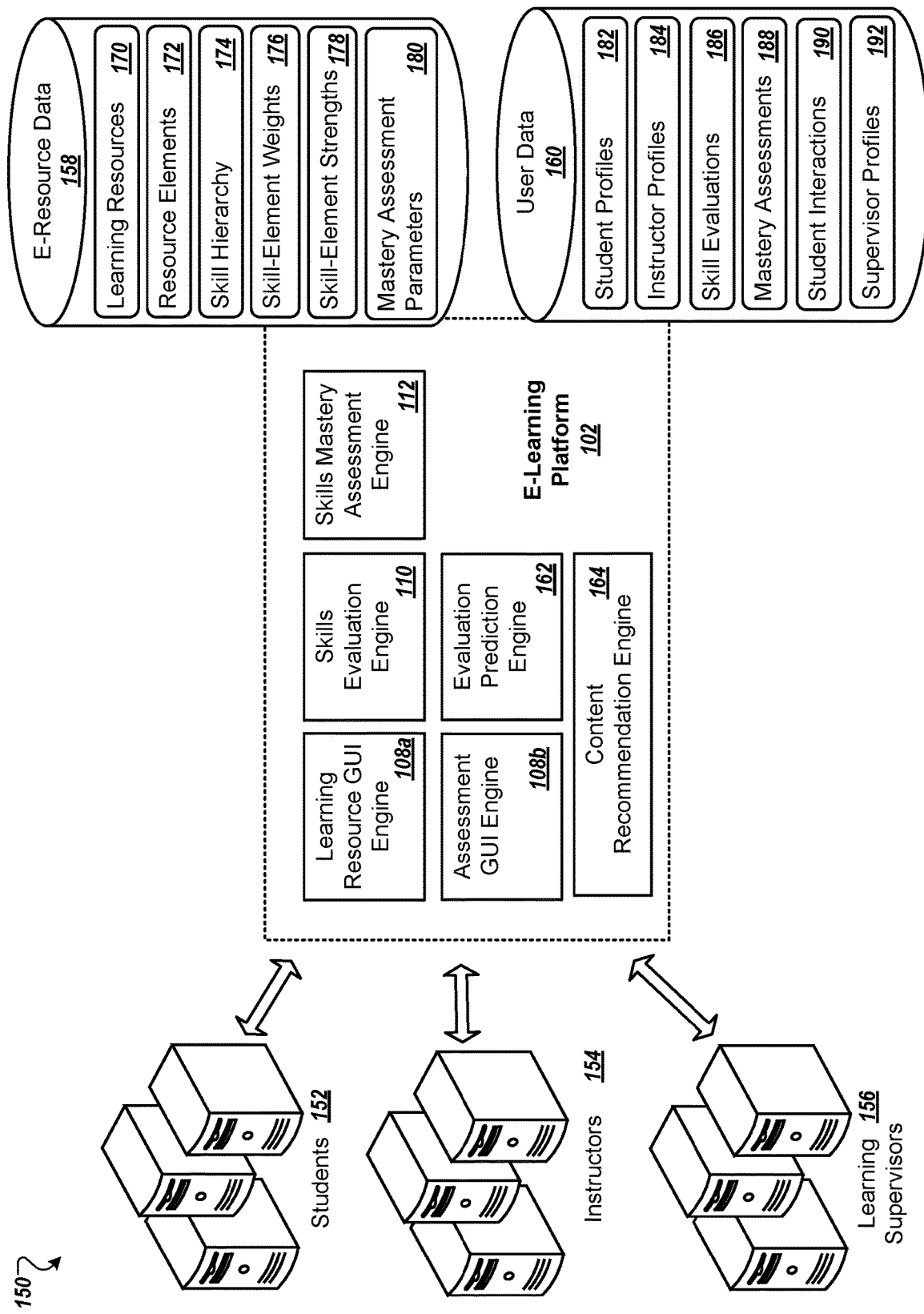
FIG. 1B is a block diagram of an example system architecture providing skills mastery assessment.

FIG. 1B is a block diagram of an example system architecture and environment 150 for providing skills mastery assessment. The system 150, in some implementations, includes an electronic resource data repository 158, a user data repository 160, and a collection of engines of the e-learning platform 102. Students 152 (e.g., learners), instructors 154, and/or learning supervisors 156 of the students 152 (e.g., parents, guardians, other family members, daycare center personnel, nannies, etc.) may access the e-learning platform 102 to interact with the capabilities provided by the assortment of engines. For example, the students 152, instructors 154, and/or learning supervisors 156 may log on through a learning resource GUI engine 108a and/or an assessment GUI engine 108b, using information stored to a relevant profile, such as the student profiles 182, instructor profiles 184, and supervisor profiles 192 to access capabilities of the e-learning platform. For example, learning supervisors 156 may only have access to the assessment GUI engine 108b, while instructors 154 may have access to review work and/or provide online comments via the learning resource GUI engine 108a as well as accessing the assessment GUI engine 108b to track student progress. Some students may only have access to the learning resource GUI engine 108a, such that the students are not privy to the mastery assessments provided by the e-learning platform 102. Other students may have access to both the learning resource GUI engine 108a and the assessment GUI engine 108b.

In some implementations, students interact with learning resources 170, each including one or more learning resource elements 172, via the learning resource GUI engine 108a, as described in relation to FIG. 1A.

In some implementations, during and/or upon completion of interacting with a particular learning resource 170, a skills evaluation engine 110 receives student interactions 190 with learning resources 170 and assesses progress of the student 152 in one or more skills areas, as discussed in relation to FIG. 1A. The skills areas, for example, may be identified from within a skill hierarchy 174 logically linked to the learning resource elements 172 of the learning resources 170. The skills evaluation engine 110, for example, may be used to present to the student 152 via the learning resource GUI engine 108a a scoring or grading of the student's interactions with the learning resources. The scoring or grading, for example, may be stored as a skill evaluation 186.

In some implementations, a skills mastery assessment engine 112 obtains the scorings or gradings from the skills evaluation engine 110 and calculates mastery of skills. Further, if the student has prior mastery assessments 188 and/or skill evaluations 186 stored that are related to the same skill(s), in some embodiments, the skills mastery assessment engine 112 calculates the mastery assessment according to mastery assessment parameters 180 corresponding to features of the skill evaluations 186 and/or metrics derived therefrom. The features, in some examples, can correspond to aspects indicative of one or more of skill fading, imparting learning, initial level of mastery, and/or difficulty of acquiring mastery, as discussed in further detail below.

In some embodiments, the skills mastery assessment engine 112 calculates the mastery assessment based in part on skill-item weights 176 (e.g., a weight of the connection between a given resource element 172 and a given skill tagged or linked to the resource element 172 via a logical indicator of relationship) and/or skill-item strengths 178 (e.g., a strength of the connection between a given resource element 172 and a given skill tagged or linked to the resource element 172). The skill-element strength 178, for example, may represent a relevance of the skill to the individual resource element 172 (e.g., as opposed to other skills linked to the same resource element 172). The skill-item weight 176, for example, may represent an amount of learning impact provided by the content (e.g., how deeply or intensely focused a given resource element 172 is on imparting and/or assessing knowledge related to the given skill). The skills mastery assessment engine 112, for example, may access mastery assessment parameters 180 to identify algorithms and/or equations for applying factors to calculating the mastery assessments 188 including how to apply the skill-item weights 176 and/or the skill-item strengths 178.

Historic interaction data (e.g., derived from the student interactions data 190), in some embodiments, is provided to an evaluation prediction engine 162 for predicting mastery assessments based on historic data and current mastery assessment parameters 180. The evaluation prediction engine 162, for example, applies statistical analysis and/or machine learning to adjust the mastery assessment parameters 180 to best match demonstrated skill mastery derived from historic skill evaluations 186, mastery assessments 188, and/or student interactions 190. The evaluation prediction engine 162, for example, may produce one or more adjusted parameters to the mastery assessment parameters 180.

A content recommendation engine 164, in some embodiments, analyzes mastery assessments 188 to determine future content to recommend to the learner. The content recommendation engine 168, for example, may identify learning resources 170 and/or learning resource elements 172 tagged or linked to skills within the skill hierarchy 174 that would provide the learner with strengthening of developing skill sets.

Figure 2A:
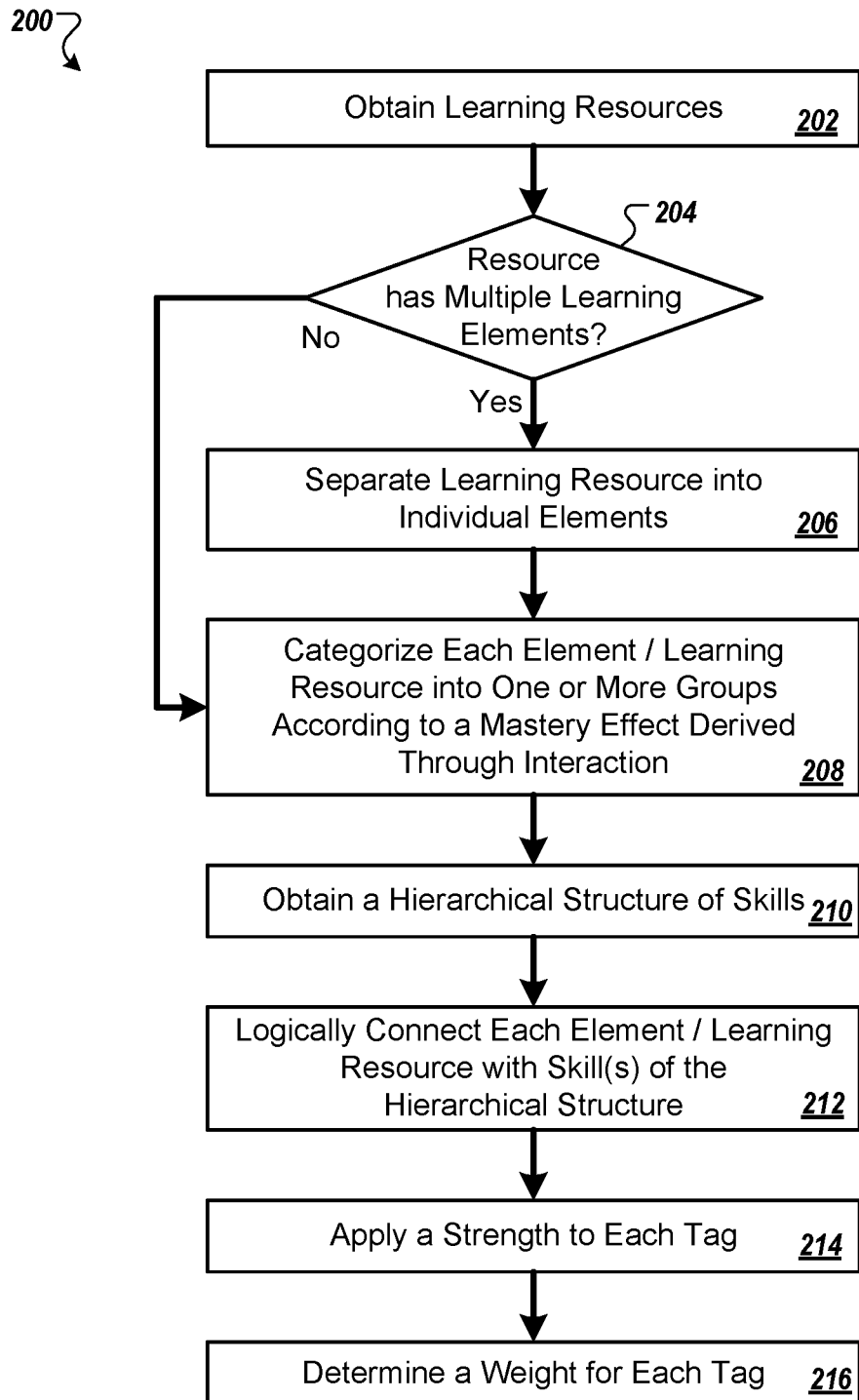
FIG. 2A is a flow chart of an example method for providing skills mastery assessment.

FIG. 2A is a flow chart of an example method 200 for organizing a data architecture supporting skills mastery assessment of learning elements within an e-learning platform. The method may be performed manually, semi-automatically, or automatically, based in part on a foundation of the data architecture in a given system. The method 200, for example, may be performed in part by the e-learning platform 102 of FIG. 1A and FIG. 1B.

In some implementations, the method 200 begins with obtaining learning resources (202). As discussed above, the learning resources, in one example, can include one or more assessment questions. In illustration, assessment questions can include an inquiry, such as "What is the derivative of sin(x)?" Further, assessment questions can include word problems, such as "A car is moving at a constant speed of 20 m/s along a curving road. The curvature radius of the road is 130 m. Find the acceleration of the car." The learning resources can include videos. For example, a learning resource can be a video of a teacher presenting a topic or a video of a person performing a science experiment. The learning resources can include one or more readings. For example, the readings can be one or more excerpts from a textbook. The learning resources can include simulations, such as a simulation of solid changing to a gas The learning resources can include one or more data manipulatives. In illustration, a manipulative can provide an interactive online exercise where the user adjusts the positioning of a tennis racket, the tension of its strings and the direction of the racket swing in order for the tennis ball to hit the target at a prescribed speed and with a prescribed spin. The learning resources can include games. For example, of the games can include a math game where the user receives points for correct answers and advances through challenges involving characters and potentially a plot or story line.

In some implementations, if a given learning resource includes multiple learning elements (204), the learning resource is separated into individual learning elements (206). For example, a quiz can contain multiple questions, where each question is a separate learning element available for later assessment. In a further example, a learning game may be separated into game levels or experience types within a game (e.g., whole numbers vs. fractions in a math game). As illustrated in an example learning resource structure 254 of FIG. 2B, for example, the learning resource 254 can be separated into two elements 254a, 254b.

In some implementations, the learning resources/resource elements are each categorized into one or more groups according to a mastery effect derived through interaction with the learning resource. If, for example, their nature is different enough so that the mastery effect from interacting with them is expected to be substantially different. Examples of groups can include, in some examples, content-type groupings, such as an instructional videos group and a questions group. In another example, groups can include groups by difficulty level, where more difficult learning resource elements may be treated differently in determining the mastery assessment.

Figure 2B:
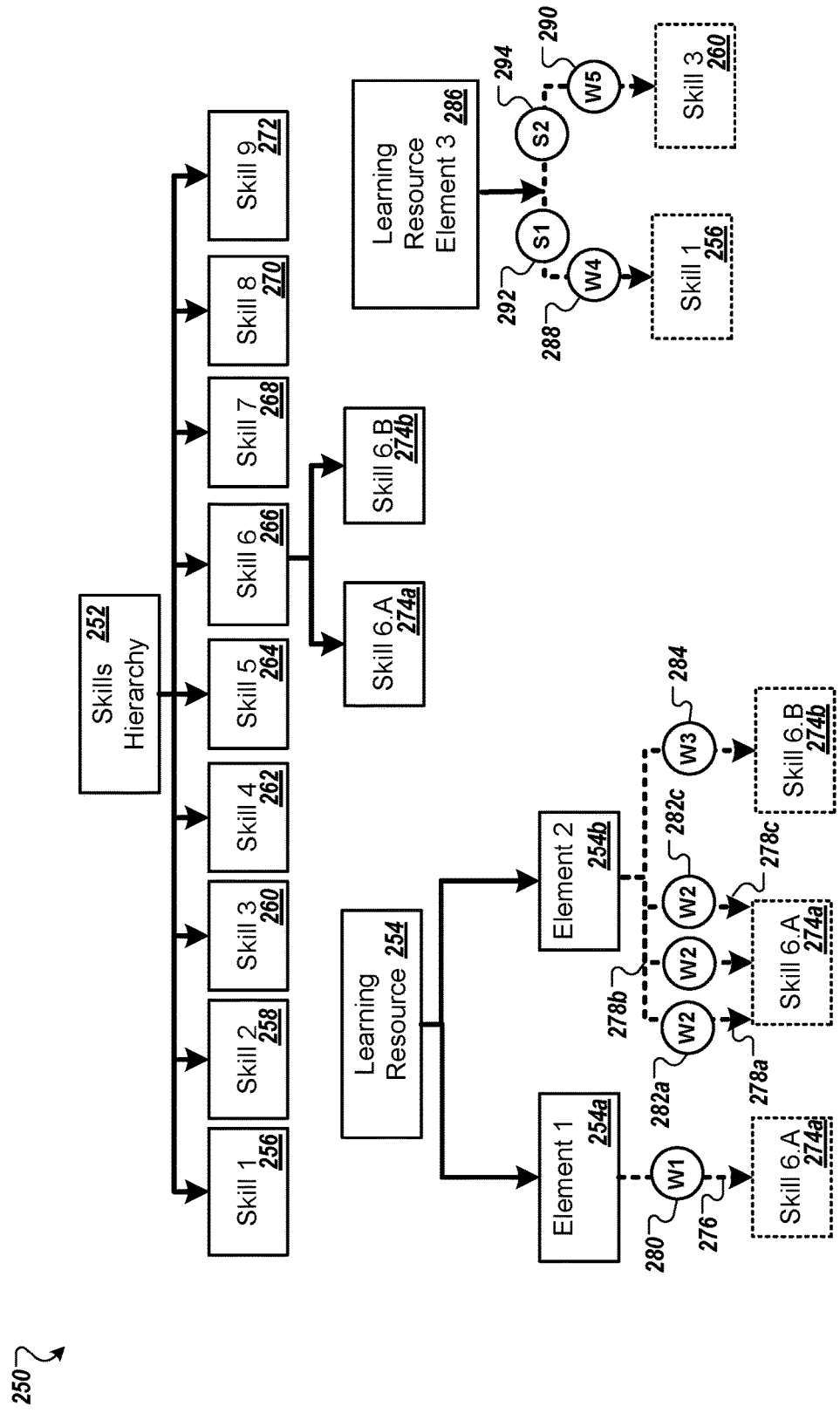
FIG. 2B is a block diagram of an example partial hierarchy of skills and connections between skills and learning resources.

In some implementations, a set of skills having a hierarchical structure are obtained (210). Skill within the hierarchical structure can be assigned a "parent" skill and/or one or more child skills, thus encoding the hierarchical structure among skills. In some embodiments, each skill has no more than one parent skill, but the same parent skill may be assigned to any number of other skills. A skill can be referred to as a "child" skill in relation to its parent skill. More generally, skills in the hierarchy can be referred to as "ancestors" or "descendants" of each other (e.g., the parent of a parent is an ancestor, and children of a child are descendants). An example partial skills hierarchy 252 is illustrated in FIG. 2B, including skills 256-272. Skill 6 266 is illustrated as having two child skills, skill 6.A 274a and skill 6.B 274b (e.g., sibling skills).

In some embodiments, the hierarchical skill structure is created by or based on a teaching standard. For example, the following two skills are parent and child skill levels derived from the Next Generations Science Standards (NGSS), which provides a hierarchical structure:

LS1.B: Growth and development of organisms.
LS1.B.2: Plants reproduce in a variety of ways, sometimes depending on animal behavior and specialized features for reproduction.

In some implementations, each learning resource or element thereof is logically connected to one or more skills of the hierarchical skill structure (212). The connections, for example, may be referred to generally as logical indicators of relationships. Connecting the individual learning resources/elements to the one or more skills, for example, can involve linking, within a database or other data network, each learning resource/element record to one or more skill records. In illustration, an individual science question element can be tagged within an American learning standards skill structure, an international learning standards skill structure, a Canadian learning standards skill structure, etc. In this manner, the same learning elements may be applied to determining mastery based upon one of a number of skills mastery formulations. For example, as illustrated in FIG. 2B, learning resource element 1 254a has been tagged with Skill 6.A 274a. Further, learning resource element 2 254b has been tagged with Skill 6.A 274a and Skill 6.B 274b.

In another example, in a multi-dimensional (cross-discipline) learning standard structure, such as the NGSS, a same learning resource element may be tagged for two or more disciplines applied to learning the particular skill. In illustration, a multi-dimensional learning standard-supporting learning resource element presenting content for developing skills related to climate, including a mathematical skill tag, a weather science skill tag, and a literacy skill tag. In illustration, as shown in FIG. 2B, a learning resource element 3 286b is linked or tagged to skill 1 256 with a weight 4 288 as well as to skill 3 260 with a weight 5 290.

In some implementations, a strength is applied to at least a portion of the tags (214). For example, the strength may indicate a strength of presentation of the skill within the tagged item (learning resource/element). In illustration, a video focused on a particular skill may receive a strong indication of strength, while another video that weaves the skill into supporting the presentation of a different skill may receive a weaker indication of strength. The strength, for example, can be a numeric value between 0 and 1, between 1 and 10, or between 1 and 100. As illustrated in FIG. 2B, for example, a strength S1 292 corresponds to a tag between learning resource element 3 286 and skill 1 256, while a strength S2 294 corresponds to a tag between learning resource element 3 286 and skill 3 260.

In some embodiments, a strength between an item (learning resource or learning resource element) and a skill may be designated by a number of connections between the item and the skill. For example, a neural network or other linked data network may express strength in the form of number of linkages. As illustrated in FIG. 2B, learning resource element 1 254a is logically connected to skill 6.A 274a through a single link 276. Conversely, learning resource element 254b is logically connected to skill 6.A 274a through a set of three logical links 278a-c.

In some implementations, a weight is determined for at least a portion of the tags (216). The weight, for example, may be a numeric value indicating a relative strength of evidence of mastery that an interaction with the respective element or learning resource (e.g., item) carries. For example, a depth of knowledge (DOK) is a common characteristic of learning resources that can be applied as a weight value. As illustrated in FIG. 2B, each link between learning resource elements 254a and 254b includes an associated weight 280, 282a-c, 284.

Although illustrated as a particular series of operations, in other implementations, the method 200 may include more or fewer operations. For example, strengths may not be determined for tags (214) and/or weights may not be determined for each tag (216). Further, in some implementations, one or more operations may be performed in a different order and/or in parallel. For example, weights may be determined (216) prior to applying strengths to each tag (214). In another example, the learning resources may be grouped after applying strengths (214) and/or weights (216). Other modifications of the method 200 are possible while remaining within the scope and spirit of the disclosure.

Figure 3A:
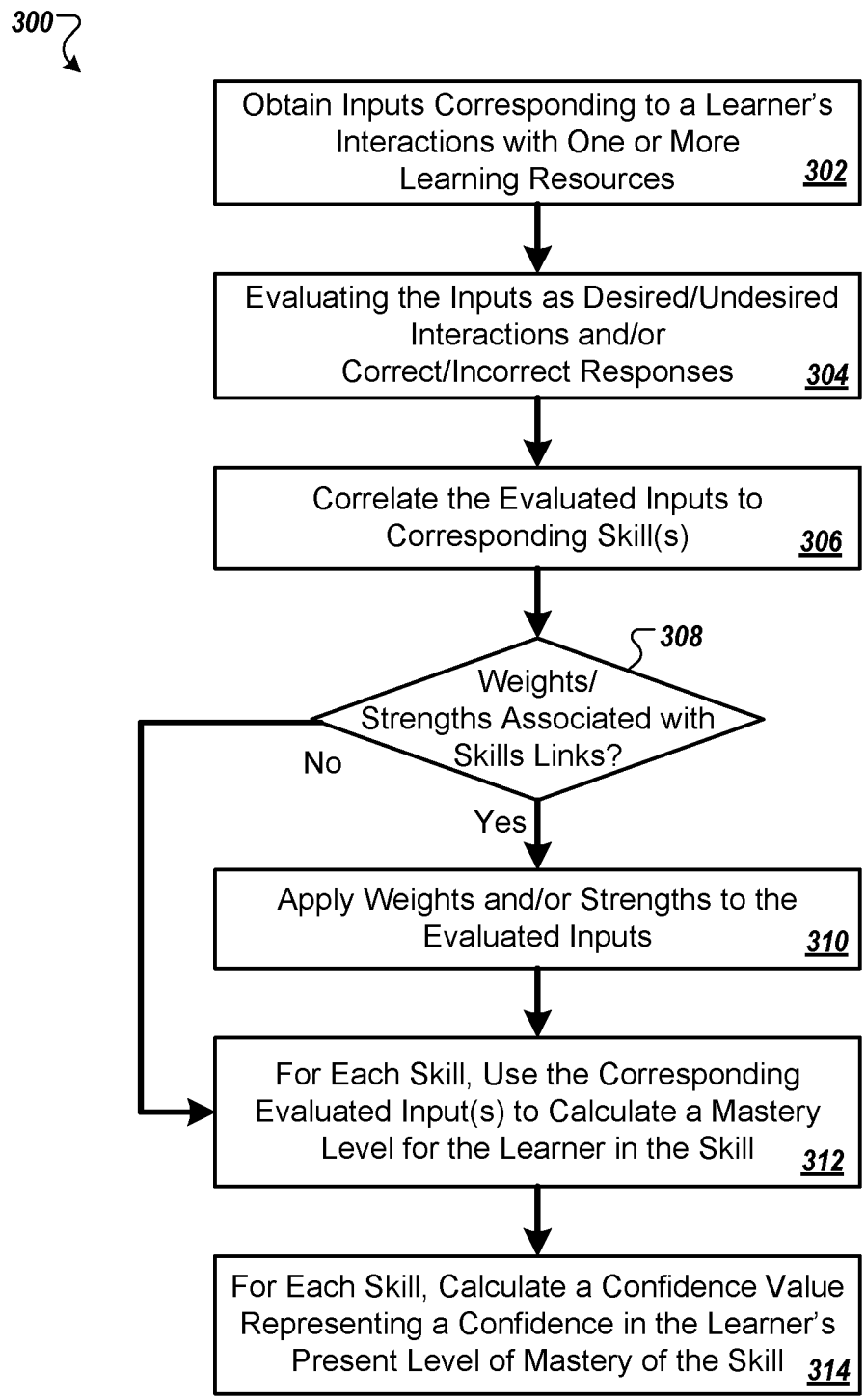
FIG. 3A is a flow chart of an example method for scoring a skills assessment.

Turning to FIG. 3A, a flow chart presents an example method 300 for determining evidence of mastery of skills within a skill hierarchy using a linked learning resource and skill hierarchy data architecture established, for example, through the method 200 of FIG. 2A. Portions of the method 300, for example, may be performed by the skills evaluation engine 110 and/or the skills mastery assessment engine 112 of FIG. 1B.

In some implementations, the method 300 begins with obtaining inputs corresponding to a learner's interactions with one or more learning resources (302). The inputs, in some examples, can include answers to questions, completion of tasks, and/or scores/levels achieved in playing a game. For example, the inputs may relate to each user submission relevant to individual evaluation, such as clicking a selection of a multiple-choice answer or entering a series of adjustments to an interactive model. The inputs, for example, may be obtained by the learning resource GUI engine 108a of FIG. 1B.

In some implementations, the inputs are evaluated in accordance with evaluation rules related to desired/undesired interactions and/or correct/incorrect responses to the items (learning resources and/or elements thereof) (304). Some inputs, for example, may include graded/scored interactions, such as answers to quiz questions. Some inputs, in another example, may include ungraded/unscored interactions (e.g., completed or not completed), such as playing a video to its entirety or dwelling on a reading element long enough to have more likely than not read the content. As such, at least some of the inputs are evaluated based on evaluation rules pertaining to partial credit for achieving a portion of the goal(s) of the learning element. In other examples, partial credit may be associated with completing part of a learning game (e.g., running out of attempts prior to completion of a game level) or completing a portion of a quiz. Evaluating the inputs, for example, can include "grading" activities performed within the e-learning platform. The evaluating may be performed, for example, by the skills evaluation engine 110 of FIG. 1B.

In some implementations, the interactions and/or responses (e.g., the "graded content") are correlated with corresponding skills (306). For example, the links or tags between the items (learning resources and/or their individual elements) and skills in a skills hierarchy are identified to assess progress in relation to skills of the skills hierarchy. For each of the one or more skills that a particular item (learning resource or element thereof) is tagged with, a change in the mastery level of the respective skill can be determined. The skills mastery assessment engine 112 of FIG. 1B, for example, may correlate the interactions and/or responses with the corresponding skills.

In some implementations, if the tags or links between each item and one or more corresponding skills have an applied strength (e.g., as described in relation to operation 214 of the method 200 of FIG. 2A) and/or weight (e.g., as described in relation to operation 216 of the method 200) (308), the weight and/or strength is applied to the evaluated inputs to calculate adjusted interactions/responses (310). For example, numeric values representing an evaluation of each input may be weighted, multiplied, or otherwise altered by a factor representative of the strength and/or weight of the tag. Turning to FIG. 2B, since the strength between learning resource element 2 254b and skill 6.A 274a is represented as three separate links, applying this strength may involve multiplying the evaluation of the input by three (e.g., this answer is worth three times the value of other answers in demonstrating mastery of the skill 6.A 274a). Further, a weight W2 282a-c may be applied to one or all of the links representing strength, such that the weight adjusts the evaluation value by a relative importance of skill 6.A to the learning resource element 2 254b.

In some embodiments, application of weights and/or strengths may differ based on whether the learner entered a correct answer or an incorrect answer. For example, only correct answers may be magnified by the strength factor, while all answers are magnified by the weight factor. Other combinations are possible.

In some implementations, for each skill, the corresponding evaluated one or more inputs is used to calculate a mastery level for the learner in the skill (312). The mastery level, for example, represents a relative grasp of the subject matter of a given skill within the skill hierarchy. The mastery level may be calculated, in some examples, by determining a median, mean, or weighted average of the values of the evaluated inputs in each respective skill. Mastery level, in further examples, may be calculated in part on one or more factors (e.g., a portion of the mastery assessment parameters 180). The factors, in some examples, can include a difficulty of the learning resource element (e.g., amplifying positive scores/values for difficult learning elements) and/or one or more medical factors of a learner's student profile 182 (e.g., a learning disability, neurological disorder, physical hindrance, or other impediment that may modify the learner's patterns of interactions in relation to other learners within a same group (e.g., age, grade, etc.).

In some implementations, for each skill, a confidence value representing a confidence in the learner's present level of mastery of the skill is calculated (314). The confidence value, in some examples, may include a confidence interval (e.g., +/−a margin surrounding the calculated mastery assessment), a percentage confidence, or a confidence rating (e.g., high confidence, medium confidence, low confidence, etc.).

Although illustrated as a particular series of operations, in some embodiments, the operations of the method 300 are performed in a different order and/or one or more of the operations of the method 300 are performed in parallel. For example, the operations 310, 312, and 314 may be performed in parallel for each skill of the one or more skills. In some embodiments, the method 300 includes more or fewer operations. For example, the method 300 may include calculating mastery assessment metrics based on change in mastery level over time, such as a rate of increase in mastery level. Other modifications of the method 300 are possible while remaining in the scope and spirit of the disclosure.

In some implementations, the mastery level is presented for review by a user, such as the learner, a supervisor, or a teacher. If past mastery assessments 188 are available, mastery assessments may be presented over time to demonstrate the learner's progress in mastering the subject skill.

Figure 5A:
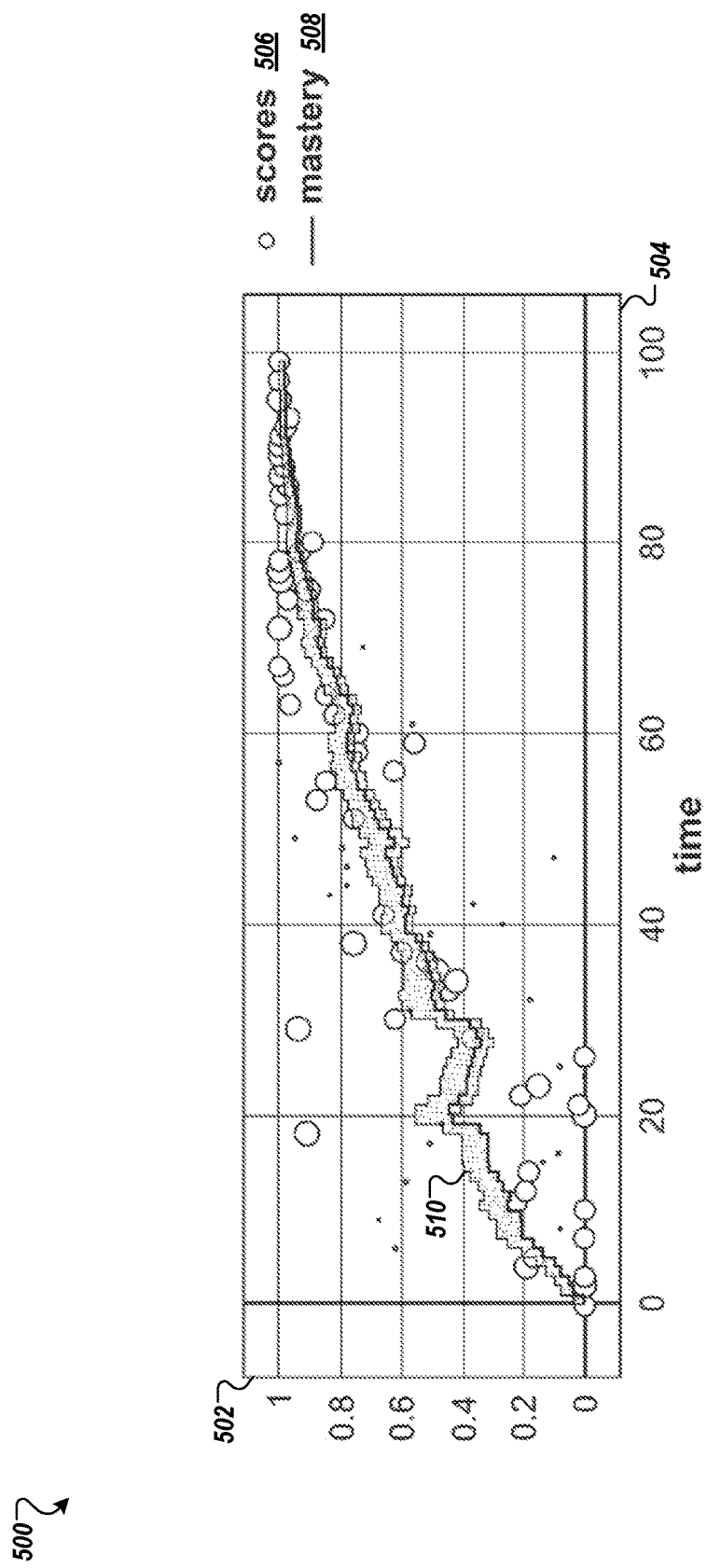
FIGS. 5A and 5B are example graphical displays representing evidence of mastery.

In one example, turning to FIG. 5A, a screen shot of an example mastery assessment graph 500 presents a synopsis of a learner's progress in mastering a particular skill as visualized in relation to achievement 502 (e.g., percentage accuracy of user inputs/percentage mastery demonstrated) over time 504. Each of the illustrated score indicators (circles) 506 represents a score received (e.g., scaled from 0 to 1), with a size of each score indicator 506 representing the relative relevance of the score to the skill (e.g., a tagged strength of the learning resource element corresponding to the score and/or a tagged weight of the learning resource element corresponding to the score). A mastery level plot 508 is represented by a solid line upon the graph 500, illustrated movements within the learner's achieved mastery level over time. As illustrated, the learner began interacting with the platform with a relatively low mastery level (e.g., appearing to be a little less than 0.1) and over time (e.g., from a day/time 0 to a day/time 100) has achieved a mastery level near 1 (e.g., near complete mastery). A band 510 surrounding the mastery level plot 508 represents a confidence interval for the mastery level at each point along the mastery level plot 508. In some embodiments, the time represents a total time the learner has spent working on the particular skill within the e-learning platform, such as 100 days, 100 hours or 100 minutes.

Figure 3B:
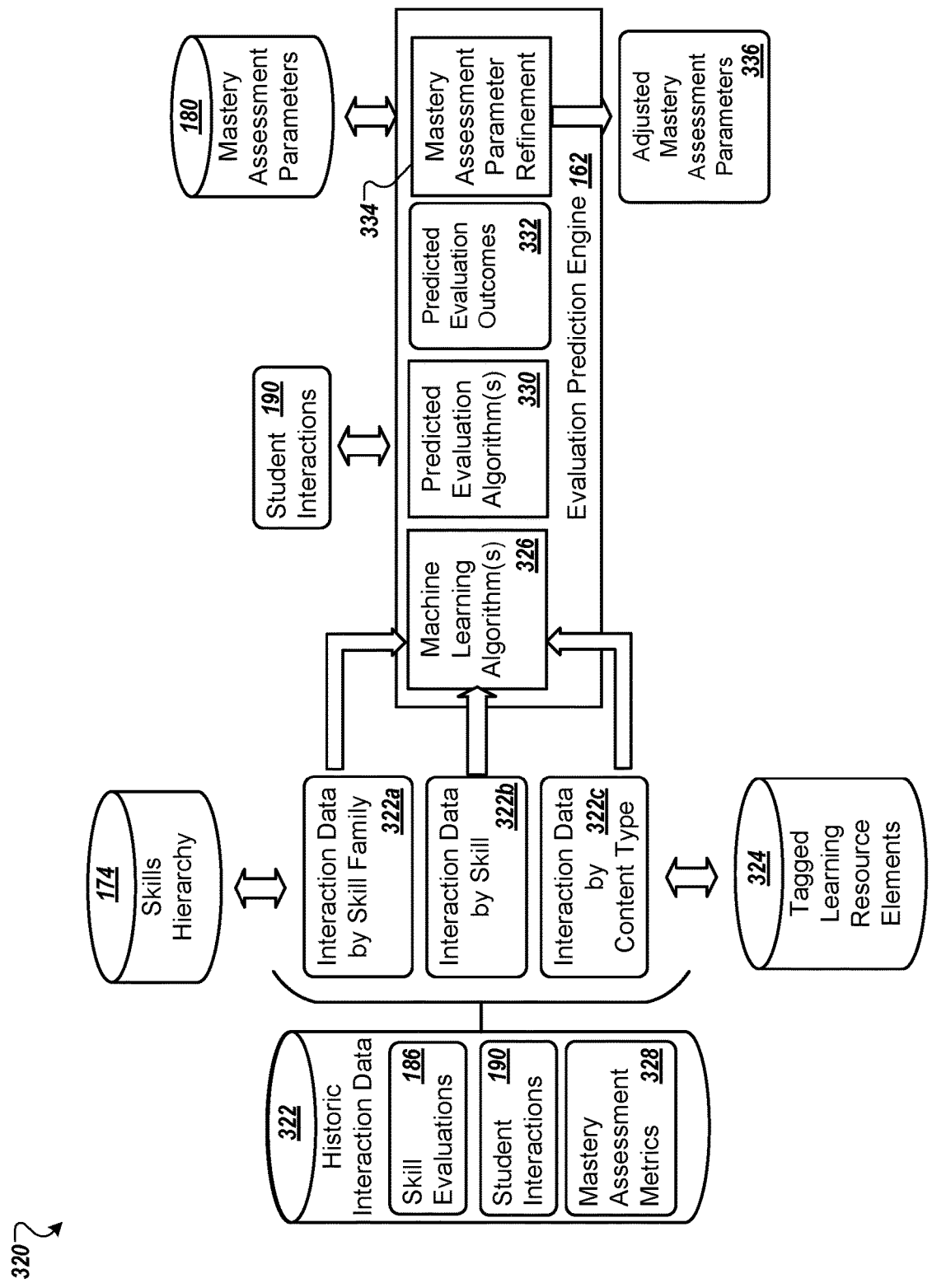
FIG. 3B is a flow diagram of an example process for training scoring parameters for scoring a mastery assessment.

In some implementations, the mastery level determination is trained for optimal performance, thereby maximizing its predictive power, using historical data collected by the e-learning platform to refine mastery assessment parameters. Turning to FIG. 3B, a flow diagram illustrates an example process 320 for training the mastery assessment parameters 180 using historic interaction data 190. In some embodiments, the mastery assessment parameters include factors such as student age, student region, student grade level, and/or learning standard that factor into one or more algorithms for calculating, from skill evaluations, the mastery assessment. The mastery assessment parameters, 180, in some embodiments, includes multiple sets of mastery assessment parameters. The mastery assessment parameters 180 may be divided into parameters per group of a set of learner groups. Learners may be separated into groups, in some examples, based on particular learning standards (e.g., a U.S. public school skills hierarchy, a Canadian public school skills hierarchy, a per school district standard, etc.), grade level, age or age range (e.g., early grade school range, later grade school range, middle school range, high school range, etc.), and/or geographic region (e.g., city, county, zip code, area code, state, province, etc.).

In some implementations, historic interaction data 322, including, in some examples, skills evaluations 186, user interactions 190, and/or timestamps corresponding to at least a portion of the user interactions 190 (e.g., beginning and ending/time elapsed for taking quiz, time of submission of an answer to a question, etc.) is supplied to one or more machine learning algorithms 326 of the evaluation prediction engine 162. The user interactions 190, in a further example, can include a number of actions taken during the interaction (e.g., how many individual adjustments applied to an interactive physics model to achieve a successful result, a number of "lives" used in achieving conclusion of a learning game, a number of times a video presentation was paused, etc.). The historic interaction data 322, in another example, may include historic mastery assessment metrics 328 such as, in some examples, an initial mastery level related to each skill, a rate of improvement in mastery level related to each skill, a length of time to progress between mastery levels, and/or a length of time elapsed between mastery assessments. The historic interaction data 322 may be correlated to skills within the skills hierarchy 174 and/or to tagged learning resources/learning resource elements 324 (e.g., to access skill-element weights 176 and/or skill-element strengths 178 as discussed in relation to FIG. 1B).

In some implementations, training data 322 provided to the machine learning algorithm(s) 326 includes interaction data grouped by skill family 322a (e.g., including ancestors and descendants along a branch of the skills hierarchy 174), interaction data grouped by skill 322b, and/or interaction data grouped by content type 322c (e.g., videos, quizzes, games, etc.). For example, different machine learning algorithms 326 may be better suited to assess different types of historic interaction data 322 (e.g., math & science intensive in comparison to foreign language learning, games in comparison to quizzes, etc.).

The machine learning algorithm(s) 326 are designed to forecast evaluation outcomes based on student interaction data 190. The machine learning algorithm(s) 326, in some embodiments, include a regression model, such as a K-nearest neighbor (KNN) regression model or a support vector regression (SVR) model. The regression model, in other examples, may apply a moving linear regression, a weighted moving average, or an exponentially weighted moving linear regression.

In some embodiments, forecasting evaluation outcomes using the machine learning algorithm(s) 326 includes predicting, based on patterns of student behavior, future movement in achievement in interacting with learning resource elements 172. These patterns of student behavior, in some examples, can take into account the impact on student achievement by factors such as fading, imparting learning, initial level of mastery, and/or difficulty of acquiring mastery. For example, the machine learning algorithm(s) 326 may detect patterns related to a time it takes learners to progress through levels of mastery (e.g., a rate of learning effect on progressing to mastery of a skill). In another example, the machine learning algorithm(s) 326 may detect patterns related to the impact of initial familiarity with a skill on a learner's future progress through levels of mastery. Initial skill familiarity, in some examples, may be found by the machine learning algorithm(s) 326 to involve the first score corresponding to a particular skill of the skill family (ancestors and descendants), the first score corresponding to one of the learning resource elements 172 linked as having strong relevance to the particular skill (e.g., based on skill weightings 176 and/or skill strengths 178), or a first N (e.g., 2, 3, up to 5, etc.) scores corresponding to the particular skill. In a further example, the machine learning algorithm(s) 326 may detect patterns related to an amount of time it takes a learner to progress from the original interaction to mastery of the particular skill (e.g., a rate of learning effect on progressing to mastery of a skill) which may be indicative of a difficulty in learning the skill. Further in relation to a learner's difficulty in acquiring mastery of a particular skill, the machine learning algorithm(s) 326 may detect patterns related to a number of repetitions with learning resource elements. In another example, the machine learning algorithm(s) 326 may detect patterns related to the effect fading has on skill acquisition due to failing to exercise the skills on a regular basis over time. The training data 322, in an illustrative example, may include timestamps useful in deriving frequency of engagements with learning resources 170/learning resource elements 172 associated with a particular skill family of the skill hierarchy 174.

The predicted evaluation algorithm(s) 330, in some implementations, intake historic student interactions data 190 and apply the machine learning algorithms 326 to predict skill evaluations, resulting in predicted outcomes 332.

In some implementations, the predicted outcomes 332 are applied by a mastery assessment parameter refinement module 334 to refine current mastery assessment parameters 180 to better align with learners' actual achievement data as analyzed by the machine learning algorithms 326. By applying the historic interaction data 322 to predict the outcomes achieved by a user on any subset of learning resource elements and comparing the predicted outcomes 322 with the skill evaluations 186 received by learners in reality, the mastery assessment parameter refinement module 334 of the evaluation prediction engine 162 may re-tune the mastery assessment parameters 180 to maximize the prediction accuracy of the mastery assessments 188. The mastery assessment parameter refinement module 334 may output one or more adjusted mastery assessment parameters 336 for replacing one or more of the parameters of the mastery assessment parameters 180. The adjustments in the mastery assessment parameters 180, in some examples, can include an adjusted weight for applying a particular parameter to the mastery assessment calculation algorithm, an adjusted sub-algorithm (e.g., logarithmic application of the particular assessment parameter 180 rather than linear application of the particular assessment parameter 180) for applying a particular parameter to the mastery assessment algorithm, and/or an adjusted rule for applying a particular parameter to the mastery assessment algorithm (e.g., in cases where a particular timing factor is greater than N days, etc.).

In some embodiments, the mastery assessment parameter refinement module 334 may propose an additional parameter to include within the calculations of the skills mastery assessment engine 112 of FIG. 1B to refine analysis of the skill evaluations 186. In an initial example, if factoring in certain timing data elements of the student interactions data 190 would lead to better accuracy of the mastery assessments 188, the mastery assessment parameter refinement module 334 may propose inclusion of such timing data in the mastery assessment parameters 180.

The process 320, in some embodiments, is performed periodically. For example, the process 320 may be performed monthly, bi-weekly, weekly, or daily. In some embodiments, the process 320 is performed for each set of mastery assessment parameters. Individual sets of mastery assessment parameters, for example, can correspond to individual learner groups assessed by the electronic learning platform (e.g., age, grade level, and/or region, etc.) and/or individual skill hierarchies used for evaluation purposes within the electronic learning platform (e.g., based on different learning standards) to customize assessments for different learner experiences and/or different instructor or learning supervisor desires. A same learner may be assessed under multiple learning standards and/or as part of multiple learner groups, providing the ability for the e-learning platform to present apples-to-apples comparisons of engagement outcomes across swaths of learners engaging with the e-learning platform. The training data 322, in some implementations, is filtered based on one or more criteria, such as a threshold length of time a corresponding learner has been engaging with the e-learning platform and/or a threshold mastery assessment level acquired by the e-learner in a subject skill or skill family. A same underlying type of machine learning algorithm 326, therefore, can be trained using multiple variations of sets of training data to derive refined mastery assessment parameters focused to a select subset of the learners of the e-learning platform.

Figure 4:
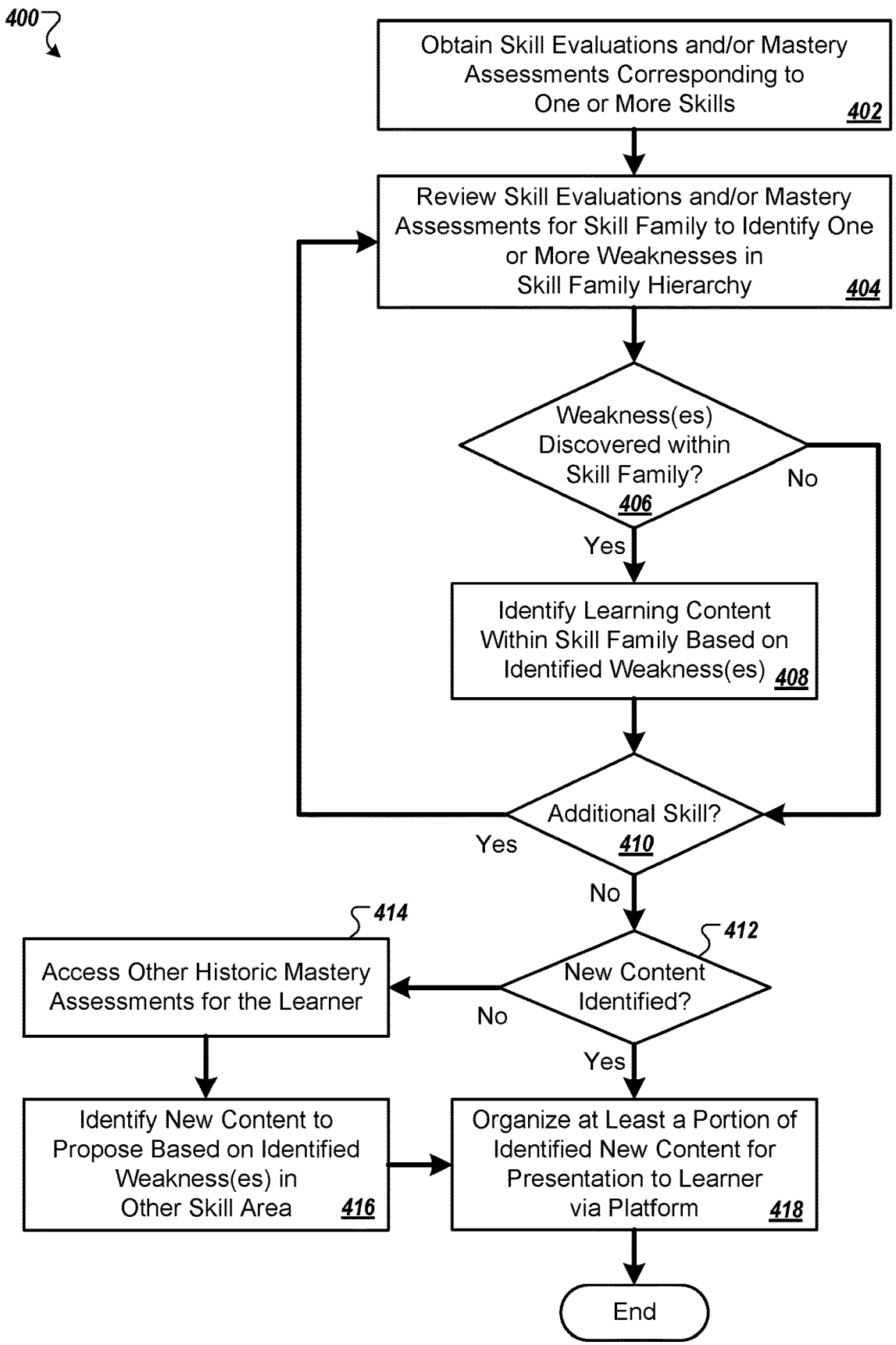
FIG. 4 is a flow chart of an example method for using knowledge tracing to propose new content to a learner based on historic mastery assessments.

FIG. 4 is a flow chart of an example method 400 for using knowledge tracing to propose new content to a learner based on historic mastery assessments. At least a portion of the method 400, for example, may be performed by the content recommendation engine 164 of the e-learning platform 102 of FIG. 1B. The method 400, for example, may result in information being presented to a learner via the learning resource graphical user interface engine 108a of FIG. 1B.

In some implementations, the method 400 begins with obtaining skill evaluations and/or mastery assessments corresponding to one or more skills (402). For example, historic mastery assessments 188 and/or skill evaluations 186 for a given student profile 182 related to a skill family of the skill hierarchy 174 (e.g., descendants of a particular skill branch, as described in relation to FIG. 2B) may be accessed from the user data store 160 of FIG. 1B.

In some implementations, the skill evaluations and/or the mastery assessments are reviewed for the target skill family to identify one or more weaknesses the learner exhibits within the skill family hierarchy (404). The weaknesses, for example, may involve a particular skill, such as skill 6.A 274a of the skills hierarchy 252 of FIG. 2B, or a branch (e.g., skill 6.A 274a and any descendants thereof). The weaknesses, in one example, can include missing skill evaluations (e.g., the learner has not yet been presented with any learning resources 170/resource elements 172 related to a particular skill or skills of the skill family). In another example, the weaknesses can include low skills evaluations related to learning resources 170/resource elements 172 involving one or more particular skills of the skill family (e.g., evaluations having a value beneath a threshold criteria, evaluations having a value below a typical evaluation value for the particular learner, etc.). In a further example, the weaknesses can include low skills evaluations related to particular types of learning resources 170/resource elements 172 involving one or more particular skills of the skill family (e.g., the learner appears to struggle with word problems related to the math skill family).

In some implementations, if weaknesses are discovered within the skill family (406), learning content is identified within the skill family based on the identified weakness(es) (408). The learning content, for example, can include learning resources 170/resource elements 172 tagged with the skill identified as needing strengthening. The learning content identified may include content having at least X threshold weight (e.g., according to skill-element weights 176 of FIG. 1B) and/or Y threshold strength (e.g., according to skill-element strengths 178 of FIG. 1B) to ensure that the content is valuable in bolstering the learner's comprehension of the skill. In some embodiments, if the learner has reviewed all relevant content related to the skill, the learning content may be content the learner has not engaged with in a while and/or content the learner was less successful with during engagement (e.g., skill evaluation below a threshold score).

In some implementations, whether or not weaknesses were identified (406), it is determined whether additional skills are being considered at this time (410). The additional skills, for example, may be related skills within a multi-dimensional skill hierarchy. In another example, the additional skills may be other skills of focus to the learner at the present time. If there are additional skills, the method 400, in some embodiments, repeats operations 404 through 408 for each additional skill.

Once all skills have been evaluated (410), in some embodiments, if new content was identified in operation 408 (412), at least a portion of the identified new content is organized for presentation to the learner via the e-learning platform (418). Identified new content may be ranked and/or sorted, in some examples, by anticipated impact to the learner (e.g., based on strengths and/or weights of the skill in relation to the content), by newness to the learner (e.g., as opposed to similar types of learning resources/resource elements already engaged by the learner), and/or recency of review by the learner (e.g., if the learner has already engaged with all content related to the particular skill). The student interactions data 190, for example, may be evaluated for recency of interactions, types of content the learner has engaged with in the past, and other metrics applicable to determining best content to provide to the user to increase mastery of the skills.

If, instead, no new content was identified (412), because the learner has already mastered the area of the subject skill(s), in some implementations, other historic mastery assessments for the learner are accessed (414) and new content is identified based on weakness(es) in other skill areas (416). The analysis, for example, may be similar to the analysis described in relation to step 408. The other skill areas, in some examples, may represent next skill areas within a learning standard, one or more skills tertiary to or building upon the subject skill(s), or skills related to the subject skill(s) within a multi-dimensional skill hierarchy. The new content, similarly, can be organized for presentation to the learner (418).

Although illustrated as a particular series of operations, in some embodiments, the operations of the method 400 are performed in a different order and/or one or more of the operations of the method 300 are performed in parallel. For example, the operations 406 and 408 may be performed in parallel for each skill of the one or more skills. In some embodiments, the method 400 includes more or fewer operations. Other modifications of the method 300 are possible while remaining in the scope and spirit of the disclosure.

In some implementations, the assessment GUI engine 108b is configured to present mastery assessments representing data related to a population of learners. Such assessments may be presented to instructors 154 and/or learning supervisors 156. In some examples, a particular classroom, grade of a particular school, grade of a particular school district, group of preschoolers at an early learning facility, or other population may be tracked for progress over time.

Figure 5B:
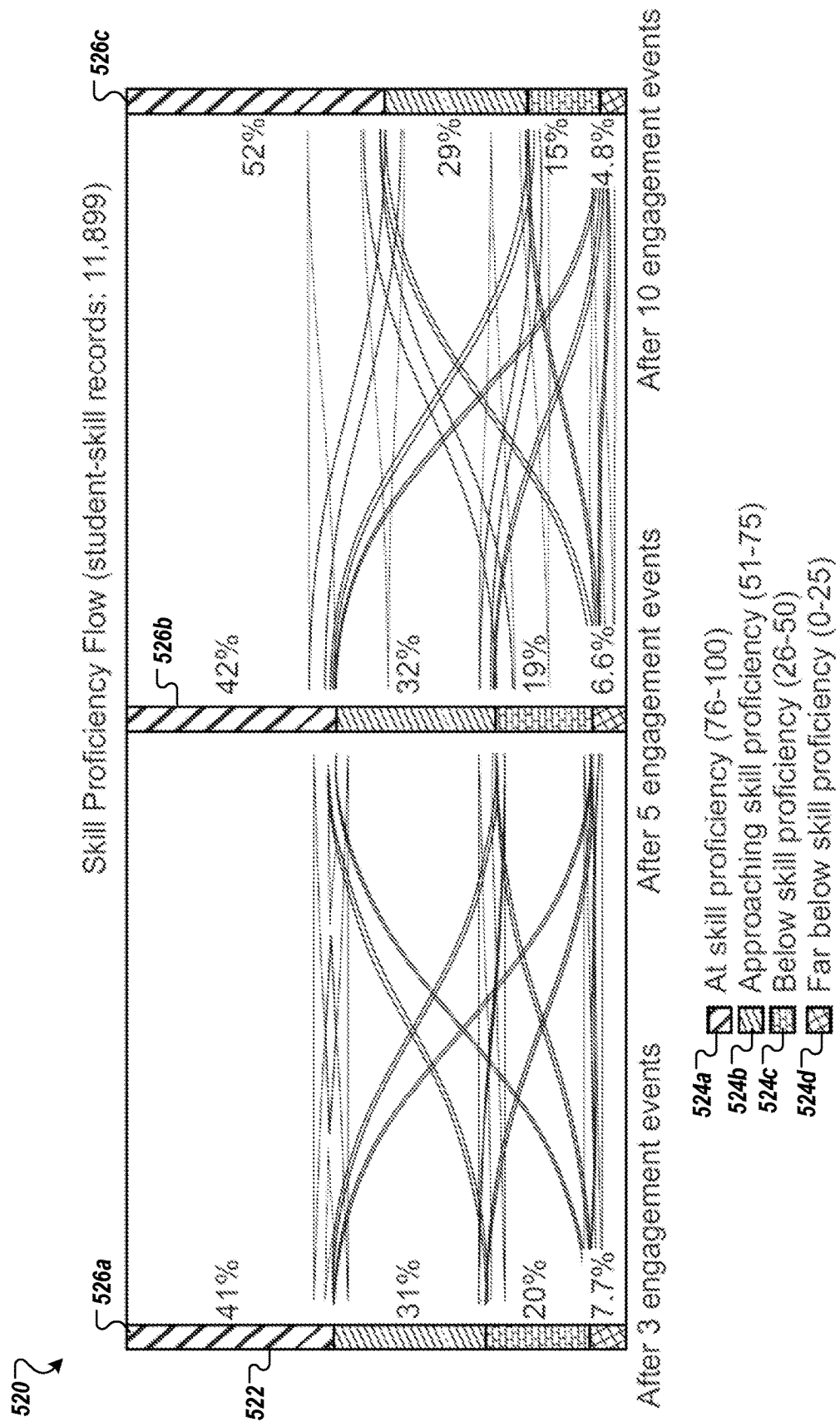

Turning to FIG. 5B, a screen shot of an example skill proficiency flow graph 520 illustrates mastery assessments measured, for example, on a scale 522 from 0% mastery to 100% mastery and the mastery assessments of the learner population are grouped into quartiles of mastery 524a-d. The quartiles of mastery 154, as illustrated, are separated into a "far below skill proficiency" level 524a, a "below skill proficiency" level 524c, an "approaching skill proficiency" level 524b, and an "at skill proficiency" level 524a. Assessment points 526, on the x-axis, are identified as "after 3 engagement events 526a, "after 5 engagement events" 526b, and "after 10 engagement events" 526c. An engagement event, for example, may be qualified as interaction with a learning resource 170/resource element 172 resulting in a skills evaluation 186.

As illustrated in the graph 520, changes in mastery of the skill are traced for each learner of the population, where skill proficiencies are demonstrated as improving, remaining substantially the same, and/or diminishing among members of the population between each pair of the assessment points (points 526a and 526b, points 526b and 526c). As learners interact with additional learning resources 170/resource elements 172, for example, a difficulty level may increase, for example leading to a reduction in perceived skill proficiency despite the additional exposure to the skill in general. However, overall, for each later assessment point 526b and 526c, the relative percentage of learners in the "far below skill proficiency" level 524d diminishes, and the relative percentage of learners in the "at skill proficiency" level 524a increases.

In some implementations, the graph 520 is an interactive graph, allowing a reviewer to drill down or obtain additional information regarding the movements of the students. For example, the review of the graph 520 may be enabled to review numbers of students maintaining level (e.g., 524a-d), increasing level, or decreasing level through hovering over points on the graph 520.

Reference has been made to illustrations representing methods and systems according to implementations of this disclosure. Aspects thereof may be implemented by computer program instructions. These computer program instructions may be provided to a processor of a general-purpose computer, special purpose computer, or other programmable data processing apparatus and/or distributed processing systems having processing circuitry, such that the instructions, which execute via the processor of the computer or other programmable data processing apparatus, create means for implementing the functions/operations specified in the illustrations.

One or more processors can be utilized to implement various functions and/or algorithms described herein. Additionally, any functions and/or algorithms described herein can be performed upon one or more virtual processors. The virtual processors, for example, may be part of one or more physical computing systems such as a computer farm or a cloud drive.

Aspects of the present disclosure may be implemented by software logic, including machine readable instructions or commands for execution via processing circuitry. The software logic may also be referred to, in some examples, as machine readable code, software code, or programming instructions. The software logic, in certain embodiments, may be coded in runtime-executable commands and/or compiled as a machine-executable program or file. The software logic may be programmed in and/or compiled into a variety of coding languages or formats.

Aspects of the present disclosure may be implemented by hardware logic (where hardware logic naturally also includes any necessary signal wiring, memory elements and such), with such hardware logic able to operate without active software involvement beyond initial system configuration and any subsequent system reconfigurations (e.g., for different object schema dimensions). The hardware logic may be synthesized on a reprogrammable computing chip such as a field programmable gate array (FPGA) or other reconfigurable logic device. In addition, the hardware logic may be hard coded onto a custom microchip, such as an application-specific integrated circuit (ASIC). In other embodiments, software, stored as instructions to a non-transitory computer-readable medium such as a memory device, on-chip integrated memory unit, or other non-transitory computer-readable storage, may be used to perform at least portions of the herein described functionality.

Various aspects of the embodiments disclosed herein are performed on one or more computing devices, such as a laptop computer, tablet computer, mobile phone or other handheld computing device, or one or more servers. Such computing devices include processing circuitry embodied in one or more processors or logic chips, such as a central processing unit (CPU), graphics processing unit (GPU), field programmable gate array (FPGA), application-specific integrated circuit (ASIC), or programmable logic device (PLD). Further, the processing circuitry may be implemented as multiple processors cooperatively working in concert (e.g., in parallel) to perform the instructions of the inventive processes described above.

The process data and instructions used to perform various methods and algorithms derived herein may be stored in non-transitory (i.e., non-volatile) computer-readable medium or memory. The claimed advancements are not limited by the form of the computer-readable media on which the instructions of the inventive processes are stored. For example, the instructions may be stored on CDs, DVDs, in FLASH memory, RAM, ROM, PROM, EPROM, EEPROM, hard disk or any other information processing device with which the computing device communicates, such as a server or computer. The processing circuitry and stored instructions may enable the computing device to perform, in some examples, the method 200 of FIG. 2A, the method 300 of FIG. 3A, the process 320 of FIG. 3B, and/or the method 400 of FIG. 4.

These computer program instructions can direct a computing device or other programmable data processing apparatus to function in a particular manner, such that the instructions stored in the computer-readable medium produce an article of manufacture including instruction means which implement the function/operation specified in the illustrated process flows.

Embodiments of the present description rely on network communications. As can be appreciated, the network can be a public network, such as the Internet, or a private network such as a local area network (LAN) or wide area network (WAN) network, or any combination thereof and can also include PSTN or ISDN sub-networks. The network can also be wired, such as an Ethernet network, and/or can be wireless such as a cellular network including EDGE, 3G, 4G, and 5G wireless cellular systems. The wireless network can also include Wi-Fi®, Bluetooth®, Zigbee®, or another wireless form of communication. The network, for example, may support communications between the electronic learning platform 102 and the computing devices 106a as shown in FIG. 1A and/or between the students 152, instructors 154, and/or learning supervisors 156 and the e-learning platform 102 as shown in FIG. 1B.

The computing device, in some embodiments, further includes a display controller for interfacing with a display, such as a built-in display or LCD monitor. A general purpose I/O interface of the computing device may interface with a keyboard, a hand-manipulated movement tracked I/O device (e.g., mouse, virtual reality glove, trackball, joystick, etc.), and/or touch screen panel or touch pad on or separate from the display. The display controller and display may enable presentation of the screen shots illustrated, in some examples, in FIG. 5A and FIG. 5B.

Moreover, the present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry or based on the requirements of the intended back-up load to be powered.

The functions and features described herein may also be executed by various distributed components of a system. For example, one or more processors may execute these system functions, where the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system, in some examples, may be received via direct user input and/or received remotely either in real-time or as a batch process.

Although provided for context, in other implementations, methods and logic flows described herein may be performed on modules or hardware not identical to those described. Accordingly, other implementations are within the scope that may be claimed.

In some implementations, a cloud computing environment, such as Google Cloud Platform™ or Amazon™ Web Services (AWS™), may be used perform at least portions of methods or algorithms detailed above. The processes associated with the methods described herein can be executed on a computation processor of a data center. The data center, for example, can also include an application processor that can be used as the interface with the systems described herein to receive data and output corresponding information. The cloud computing environment may also include one or more databases or other data storage, such as cloud storage and a query database. In some implementations, the cloud storage database, such as the Google™ Cloud Storage or Amazon™ Elastic File System (EFS™), may store processed and unprocessed data supplied by systems described herein. For example, the contents of the data store 104 of FIG. 1A, the contents of the e-resource data store 158 and/or the user data store 160 of FIG. 1B, and/or the contents of the historic interaction data 322, the skills hierarchy 174, the tagged learning resource elements 324, and/or the mastery assessment parameters 180 of FIG. 3B may be maintained in a database structure.

The systems described herein may communicate with the cloud computing environment through a secure gateway. In some implementations, the secure gateway includes a database querying interface, such as the Google BigQuery™ platform or Amazon RDS™. The data querying interface, for example, may support access by the e-learning platform 102 to the e-resource data 158 and/or the user data 160. In another example, the data querying interface may support access by the evaluation prediction engine 162 to the historic interaction data 322, tagged learning resource elements 324, skills hierarchy 174, student interactions data 190, and/or mastery assessment parameters 180, as shown in FIG. 3B.

While certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system for conducting automated skills mastery assessments, the system comprising:
    a data architecture stored to at least one non-volatile computer readable medium, the data architecture comprising a plurality of electronic learning resources,
a plurality of skills arranged in a skills hierarchy comprising a plurality of skill families, each skill family comprising descendant and ancestor relationships between a respective set of skills of the plurality of skills belonging to the respective skill family, and
a plurality of logical indicators of skill-resource relationships, each logical indicator of the plurality of logical indicators defining a connection between a given resource of the plurality of electronic learning resources and a given skill of the plurality of skills, wherein
each respective electronic learning resource of the plurality of electronic learning resources is connected, via at least one of the logical indicators, to at least one skill of the plurality of skills, wherein
each logical indicator of at least a portion of the logical indicators indicates a weight representing a relative strength of evidence of mastery in the respective skill that an interaction with the respective electronic learning resource carries, and
at least a portion of the plurality of electronic learning resources are each connected, via a respective two or more logical indicators of the plurality of logical indicators, to two or more skills, wherein each logical indicator of the respective two or more logical indicators indicates a strength representing a relative strength of presentation of the respective skill within the respective electronic learning resource; and
software logic for executing on processing circuitry and/or hardware logic configured to perform operations comprising
assess engagements of a plurality of learners with the plurality of electronic learning resources via an electronic-learning platform to produce a plurality of mastery assessments, wherein
each mastery assessment of the plurality of mastery assessments corresponds to a respective learner of the plurality of learners and one or more skills of a given skill family of the plurality of skill families, and
producing each mastery assessment comprises applying a set of mastery assessment parameters to at least one mastery assessment algorithm configured to calculate a skills level based on interactions of the respective learner with a set of learning resources linked by a set of logical indicators of the plurality of logical indicators to the respective one or more skills, wherein
at least a portion of the mastery assessment parameters correspond to applying the strengths and/or weights of the respective set of logical indicators in calculating the respective mastery assessment,
using historic interaction data derived through the engagements of the plurality of learners with the plurality of electronic learning resources and historic evaluation metrics derived through a portion of the engagements of the plurality of learners with the plurality of electronic learning resources, train at least one machine learning algorithm to forecast evaluation outcomes of learning resource engagements by analyzing a time series of interactions of each learner of the plurality of learners with a collection of learning resources related to a given skill family of the plurality of skill families, wherein
a first machine learning algorithm of the at least one machine learning algorithm is a regression-based model, and
the first machine learning algorithm is trained to forecast the evaluation outcomes based at least in part on engagement patterns and engagement timings indicative of one or more of skill fading, imparting learning, initial level of mastery, or a difficulty of acquiring mastery,
apply the at least one machine learning algorithm to sets of historic time series of user interactions of a set of learners with one or more electronic learning resources of the plurality of electronic learning resources to produce predicted evaluation outcomes corresponding to the historic learner interactions,
compare the predicted evaluation outcomes with actual evaluation outcomes for the set of learners, and
based on one or more differences between the predicted evaluation outcomes and the actual evaluation outcomes, refine at least one parameter of the set of mastery assessment parameters.

2. The system of claim 1, wherein:
the plurality of electronic learning resources comprises, for each electronic learning resource of at least a portion of the plurality of electronic learning resources, two or more corresponding learning resource elements; and
assessing the engagements comprises individually assessing the engagements corresponding to each learning resource element of a given learning resource.

3. The system of claim 1, wherein the set of mastery assessment parameters is one of a plurality of sets of mastery assessment parameters, each set of the plurality of sets of mastery assessment parameters corresponding to a different learner group of a plurality of learner groups, wherein assessing the engagements of the plurality of learners comprises determining a learner group of the plurality of learner groups applicable to a given learner.

4. The system of claim 3, wherein training the at least one machine learning algorithm comprises training the first machine learning algorithm using the historic interaction data corresponding to a set of learners of a selected learner group of the plurality of learner groups.

5. The system of claim 4, wherein the skills hierarchy is one of a plurality of skills hierarchies, each skills hierarchy corresponding to a different learning model of a plurality of learning models.

6. The system of claim 5, wherein training the at least one machine learning algorithm comprises training the first machine learning algorithm using the historic interaction data corresponding to a group of learners of the plurality of learners associated with a selected skills hierarchy of the plurality of skills hierarchies.

7. The system of claim 1, wherein the plurality of logical indicators comprises a plurality of logical links between records of a database.

8. The system of claim 1, wherein the plurality of electronic learning resources comprises a plurality of questions, a plurality of videos, and a plurality of games.

9. The system of claim 1, wherein the engagements comprise at least one of text engagements, verbal engagements, or gesture engagements.

10. The system of claim 1, wherein assessing the engagements comprises, for a given learner and a given learning resource, evaluating learner inputs received during engagement with the given learning resource to identify desired/ undesired interactions and/or correct/incorrect responses.

11. The system of claim 1, wherein assessing the engagements comprises, for a given learner and a given learning resource, assessing a plurality of inputs to the electronic-learning platform to determine a portion of completion of engagement of the given learning resource.

12. The system of claim 1, wherein assessing the engagements comprises, for a given learner and a given learning resource, determining a partial score or partial credit to apply to the given learner based on an incomplete or unfinished engagement with the given learning resource.

13. The system of claim 1, wherein producing a given mastery assessment comprises applying a weighting associated with a difficulty level of a corresponding electronic learning resource of the plurality of electronic learning resources.

14. The system of claim 13, wherein the set of mastery assessment parameters comprises the weighting.

15. The system of claim 1, wherein each mastery assessment of at least a portion of the mastery assessments represents an assessment of knowledge including a subject skill and ancestral skills within the skill family of the subject skill.

16. The system of claim 1, wherein producing a given mastery assessment comprises calculating a confidence value representing a relative confidence in the mastery assessment accurately capturing a present level of the mastery of a learner in the skill.

17. The system of claim 1, wherein the first machine learning algorithm is an exponentially weighted moving linear regression.

18. The system of claim 1, wherein the operations comprise preparing, for presentation to a user at a computing device, a graphical interface presenting a progression of mastery assessments of the plurality of mastery assessments corresponding to at least one learner.

19. The system of claim 1, wherein the operations comprise selecting, based on a set of mastery assessments corresponding to a given learner, the one or more electronic learning resources of the plurality of electronic learning resources for strengthening the mastery of the at least one skill of the plurality of skills.

20. A method for conducting automated skills mastery assessments, the method comprising:
  assessing, by processing circuitry, engagements of a plurality of learners with a plurality of electronic learning resources via an electronic-learning platform to produce a plurality of mastery assessments, wherein
    the plurality of electronic learning resources is configured to present content related to a plurality of skills logically arranged in a skills hierarchy comprising a plurality of skills families,
    each mastery assessment of the plurality of mastery assessments corresponds to a respective learner of the plurality of learners and one or more skills of a given skill family of a plurality of skill families, wherein
      each respective skill family comprises descendant and ancestor relationships between a set of skills of the plurality of skills belonging to the respective family, and
      the plurality of skills are connected to the plurality of electronic learning resources via a plurality of logical indicators of skill-resource relationships, each logical indicator of the plurality of logical indicators defining a connection between a given resource of the plurality of electronic learning resources and a given skill of the plurality of skills, wherein
        each respective electronic learning resource of the plurality of electronic learning resources is connected, via at least one of the logical indicators, to at least one skill of the plurality of skills, wherein each logical indicator of at least a portion of the logical indicators indicates a weight representing a relative strength of evidence of mastery in the respective skill that an interaction with the respective electronic learning resource carries, and
        at least a portion of the plurality of electronic learning resources are each connected, via a respective two or more logical indicators of the plurality of logical indicators, to two or more skills, wherein each logical indicator of the respective two or more logical indicators indicates a strength representing a relative strength of presentation of the respective skill within the respective electronic learning resource, and
    producing each mastery assessment comprises applying a set of mastery assessment parameters to at least one mastery assessment algorithm configured to calculate a skills level based on interactions of the respective learner with a set of learning resources linked by a set of logical indicators of the plurality of logical indicators to the respective one or more skills, wherein
    at least a portion of the mastery assessment parameters correspond to applying the strengths and/or weights of the respective set of logical indicators in calculating the respective mastery assessment;
  using historic interaction data derived through the engagements of the plurality of learners with the plurality of electronic learning resources and historic evaluation metrics derived through a portion of the engagements of the plurality of learners with the plurality of electronic learning resources, training, by the processing circuitry, at least one machine learning algorithm to forecast evaluation outcomes of learning resource engagements by analyzing a time series of interactions of each learner of the plurality of learners with a collection of learning resources related to a given skill family of the plurality of skill families, wherein
    a first machine learning algorithm of the at least one machine learning algorithm is a regression-based model, and
    the first machine learning algorithm is trained to forecast the evaluation outcomes based at least in part on engagement patterns and engagement timings indicative of one or more of skill fading, imparting learning, initial level of mastery, or a difficulty of acquiring mastery;
  applying, by the processing circuitry, the at least one machine learning algorithm to sets of historic user interactions of a set of learners with one or more electronic learning resources of the plurality of electronic learning resources to produce predicted evaluation outcomes corresponding to the historic learner interactions;
  comparing, by the processing circuitry, the predicted evaluation outcomes with actual evaluation outcomes for the set of learners; and
  based on one or more differences between the predicted evaluation outcomes and the actual evaluation outcomes, refining, by the processing circuitry, at least one parameter of the set of mastery assessment parameters.

21. The method of claim 20, wherein:

the plurality of electronic learning resources comprises, for each electronic learning resource of at least a portion of the plurality of electronic learning resources, two or more corresponding learning resource elements; and assessing the engagements comprises individually assessing the engagements corresponding to each learning resource element of a given learning resource.

22. The method of claim 20, wherein the set of mastery assessment parameters is one of a plurality of sets of mastery assessment parameters, each set of the plurality of sets of mastery assessment parameters corresponding to a different learner group of a plurality of learner groups, wherein assessing the engagements of the plurality of learners comprises determining a learner group of the plurality of learner groups applicable to a given learner.

23. The method of claim 22, wherein training the at least one machine learning algorithm comprises training the first machine learning algorithm using the historic interaction data corresponding to a set of learners of a selected learner group of the plurality of learner groups.

24. The method of claim 20, wherein the skills hierarchy is one of a plurality of skills hierarchies, each skills hierarchy corresponding to a different learning model of a plurality of learning models.

25. The method of claim 24, wherein training the at least one machine learning algorithm comprises training the first machine learning algorithm using the historic interaction data corresponding to a group of learners of the plurality of learners associated with a selected skills hierarchy of the plurality of skills hierarchies.

26. The method of claim 20, wherein the plurality of logical indicators comprises a plurality of logical links between records of a database.

27. The method of claim 20, wherein the plurality of electronic learning resources comprises a plurality of questions, a plurality of videos, and a plurality of games.

28. The method of claim 20, wherein the engagements comprise at least one of text engagements, verbal engagements, or gesture engagements.

* * * * *